United States Patent
Badger et al.

(10) Patent No.: US 9,121,644 B2
(45) Date of Patent: Sep. 1, 2015

(54) METHOD AND APPARATUS FOR A COMBINATION MOVING BED THERMAL TREATMENT REACTOR AND MOVING BED FILTER

(75) Inventors: Phillip C. Badger, Florence, AL (US); Kenneth J. Dunn, Jr., Florence, AL (US)

(73) Assignee: RENEWABLE OIL INTERNATIONAL, LLC, Florence, AL (US)

( * ) Notice: Subject to any disclaimer, the term of this patent is extended or adjusted under 35 U.S.C. 154(b) by 558 days.

(21) Appl. No.: 13/441,045

(22) Filed: Apr. 6, 2012

(65) Prior Publication Data

US 2012/0258021 A1    Oct. 11, 2012

Related U.S. Application Data (60) Provisional application No. 61/472,852, filed on Apr. 7, 2011.

(51) Int. Cl.
| | |
|---|---|
| *B01J 8/02* | (2006.01) |
| *F28D 13/00* | (2006.01) |
| *C10B 49/16* | (2006.01) |
| *C10B 49/18* | (2006.01) |
| *C10B 53/02* | (2006.01) |
| *C10B 57/18* | (2006.01) |

(52) U.S. Cl.
CPC . *F28D 13/00* (2013.01); *B01J 8/02* (2013.01); *C10B 49/16* (2013.01); *C10B 49/18* (2013.01); *C10B 53/02* (2013.01); *C10B 57/18* (2013.01); *Y02E 50/14* (2013.01)

(58) Field of Classification Search
CPC ........................................................ B01J 8/02
USPC .................. 422/198, 202, 203, 275; 95/275; 110/346, 233
See application file for complete search history.

(56) References Cited

U.S. PATENT DOCUMENTS

| | | | | |
|---|---|---|---|---|
| 2,701,758 | A | * | 2/1955 | Danulat et al. ................. 48/206 |
| 2,772,873 | A | * | 12/1956 | Danulat et al. ................. 432/27 |
| 4,136,016 | A | | 1/1979 | Rosensweig |
| 4,151,044 | A | | 4/1979 | Choi |
| 4,153,514 | A | | 5/1979 | Garrett et al. |
| 4,610,344 | A | | 9/1986 | Eastman |
| 4,744,964 | A | | 5/1988 | Kuhl |
| 4,846,621 | A | | 7/1989 | Warsaw |
| 5,961,786 | A | | 10/1999 | Freel et al. |
| 7,169,207 | B2 | * | 1/2007 | Vegge et al. ................. 75/10.27 |

(Continued)

OTHER PUBLICATIONS

Basu, P., "Biomass Gasification and Pyrolysis, Practical Design and Theory", Academic Press, 2010.

(Continued)

*Primary Examiner* — Walter D Griffin
*Assistant Examiner* — Huy-Tram Nguyen
(74) *Attorney, Agent, or Firm* — Welsh Flaxman & Gitler LLC (57) ABSTRACT

A moving bed gasification/thermal treatment reactor includes a geometry in which moving bed reactor particles serve as both a moving bed filter and a heat carrier to provide thermal energy for thermal treatment reactions, such that the moving bed filter and the heat carrier are one and the same to remove solid particulates or droplets generated by thermal treatment processes or injected into the moving bed filter from other sources.

6 Claims, 3 Drawing Sheets

(56) References Cited

U.S. PATENT DOCUMENTS

| | | | |
|---|---|---|---|
| 7,202,389 B1 | 4/2007 | Brem | |
| 7,309,384 B2 * | 12/2007 | Brown et al. | 95/275 |
| 2002/0177745 A1 * | 11/2002 | Bullock | 585/240 |
| 2003/0177963 A1 | 9/2003 | Maxwell | |
| 2004/0107638 A1 * | 6/2004 | Graham et al. | 48/197 FM |
| 2006/0018739 A1 | 1/2006 | Lambert | |
| 2006/0088455 A1 | 4/2006 | Jones | |
| 2008/0006520 A1 * | 1/2008 | Badger et al. | 202/96 |
| 2008/0072807 A1 | 3/2008 | Brookes et al. | |
| 2008/0086946 A1 | 4/2008 | Weimer et al. | |
| 2008/0147241 A1 | 6/2008 | Tsangaris et al. | |
| 2008/0201980 A1 | 8/2008 | Bullinger et al. | |
| 2009/0151251 A1 | 6/2009 | Manzer et al. | |
| 2009/0151253 A1 | 6/2009 | Manzer et al. | |
| 2009/0250378 A1 | 10/2009 | Wu et al. | |
| 2010/0034718 A1 | 2/2010 | Senetar | |
| 2010/0087687 A1 | 4/2010 | Medoff | |
| 2010/0112242 A1 | 5/2010 | Medoff | |
| 2010/0121097 A1 * | 5/2010 | Sasaki et al. | 560/216 |
| 2010/0228062 A1 | 9/2010 | Babicki et al. | |
| 2010/0247154 A1 | 9/2010 | Stelter et al. | |

OTHER PUBLICATIONS

Saxena, S.C., et al., "Particulate Removal from High-Temperature, High-Pressure Combustion Gases", Progress in Energy Combustion Science, 1985, vol. II, pp. 193-251.

* cited by examiner

METHOD AND APPARATUS FOR A COMBINATION MOVING BED THERMAL TREATMENT REACTOR AND MOVING BED FILTER

CROSS REFERENCE TO RELATED APPLICATION

This application claims the benefit of U.S. Provisional Patent Application Ser. No. 61/472,852, entitled "Method and Apparatus for a Combination Moving Bed Thermal Fast Pyrolysis Reactor and Moving Bed Filter", filed Apr. 7, 2011.

This invention was made with government support under Contract No. DE-SC 00001190/DE-FG3608GO18212 and DOE 09-005287A00 awarded by the Department of Energy. The Government has certain rights in this invention.

BACKGROUND OF THE INVENTION

1. Field of the Invention

This invention generally relates to a method and apparatus that provide the basic conditions for thermal treatment of carbonaceous materials in a moving bed reactor with geometry that allows the reactor to also serve as a moving bed filter, and thereby minimize particulate entrainment in the gas stream from the reactor.

2. Description of the Related Art

The thermochemical conversion (e.g., carbonization, gasification, pyrolysis) of biomass and other carbonaceous materials (e.g., peat, coal, tires, plastics) can produce solid, liquid, and gaseous products which can be used in a variety of energy and chemical production applications. These processes are relatively fast; thus large amounts of feedstock can be converted quickly in a relatively small footprint. Due to these and other advantages, coupled with the widespread availability of carbonaceous materials for feedstocks, these processes have become important to meet the growing worldwide use of energy and chemicals.

In the following discussion the term "gas stream" is used to refer to streams that may contain gas and vapor, as well particulates (which as used herein particulates refers to droplets and solid particles) and other materials. Likewise, the term "gas" as used herein can include gas, vapor, particulates, aerosols, and other materials. The term "thermal treatment" is used to refer to carbonization, gasification, pyrolysis, liquefaction, or other related thermochemical reactions and processes, and recognize that a fast pyrolysis process is a specialized method of gasification. It should also be noted that although the present disclosure focuses upon biomass processes and fast pyrolysis processes, it is appreciated the technology embodied herein may be used in conjunction with other processes and gas streams.

Although apparatuses to perform fast pyrolysis processes can vary widely, the basic conditions required for fast pyrolysis are well known worldwide as described in U.S. Pat. No. 5,961,786. These basic requirements include:

1) An enclosed reactor to provide a reaction environment in the relative absence of oxygen,
2) A very rapid feedstock heating rate, which can be as high as 1,000,000° C. per second,
3) A controlled, elevated reaction temperature typically in the range of 350 to 800° C.,
4) A controlled, short reaction/residence time which is typically in the range of 0.03 to 2 seconds,
5) A rapid quench of the vapor, typically cooled below 350° C. within 2 seconds, to minimize time for secondary reactions to occur which would decrease liquid product yields and potentially create undesirable products.

To contrast, slow pyrolysis processes will have relatively higher gas and char yields and, when made from wood feedstocks, produce a two-phase, highly viscous oil/tar. Conversely, a well-designed fast pyrolysis system processing wood feedstocks will have a relatively high liquid yield and relatively low char and gas yields. Additionally, the fast pyrolysis of wood feedstocks should produce a single phase, relatively low viscosity liquid. Although wood is used herein as an example feedstock, other carbonaceous feedstocks can also be used.

A variety of different reactor systems have been researched for fast pyrolysis applications. As described in U.S. Pat. No. 5,961,786, these include cyclonic ablative reactor, vacuum, auger, fluidized bed, transport bed, and moving bed pyrolysis reactors.

Cyclonic Ablative Reactors

Feedstock particles are injected into cyclonic reactor systems so that the particles travel around the heated surface of the cyclone whereby they are ablatively heated and eventually vaporized. The vapors are immediately carried to a quenching device. This approach works well at a small scale, but is restricted because of the limited heat transfer rate through a reactor wall and complexity associated with scale up.

Vacuum Pyrolysis

Vacuum pyrolysis systems use a vacuum to quickly remove vapors from the surface of the reacting feedstock particles. This immediate vapor removal mitigates the need for very rapid heat transfer. Vacuum processes suffer from their high parasitic load requirements, the inherent difficulty associated with scale up, the potential for inadequate solids flow, and the general lack of demonstrated chemical conversion processes at an industrial scale.

Auger Reactors

Auger reactors typically have an auger or augers inside a horizontal cylinder or trough to convey the feedstock and circulate the feedstock against the hot cylinder wall where the feedstock can be ablatively heated. Thus auger reactors are relatively simple, inexpensive devices.

Without some type of heat carrying medium inside the reactor, auger reactors are limited in size since the reactor wall provides a limited surface area for heat transfer. The addition of fins or other protrusions, or the use of hollow heated augers does not overcome these heat transfer limitations enough to allow large scale industrial application.

Where a heat carrier is employed, research at Iowa State University has suggested heat carrier mass to feedstock mass ratios in the range of 20:1 are reasonable, which is significantly lower than the ratios typically specified for transport bed reactors.

Fluidized Bed Reactors

Fluidized bed reactors employ a bed of inert, relatively small particles in an enclosed vertical vessel that is fluidized by blowing a gas through the bed from below. The reactor bed may be heated by the fluidizing gas stream, tubes inside the bed, indirectly from the outside, or other means. Pyrolysis is achieved by direct heat transfer to the feedstock particles from the fluidizing gas and from ablation with the bed particles.

Although fluidized bed fast pyrolysis reactors achieve rapid heating rates and a controlled elevated temperature, they are limited by relatively long residence times that are beyond the optimal required for maximum yields of liquids and certain valuable chemicals. Major limitations of fluidized bed reactors are the relative high difficulty to scale them up for industrial applications and the high energy requirements for fluidization. The heat carrying capacity of a gas is also limiting.

Transport Reactors

Transport reactors are configured similar to fluidized bed reactors with a mixing zone that is analogous to the bed in a fluidized bed reactor. These reactors are defined according to the nature of the transporting medium, which can be a non-oxidative transport gas or non-oxidative transport gas plus solids, and by the direction of flow through the reactor, which can be downflow or upflow.

In order to achieve the high heat transfer rates required for fast pyrolysis, transport bed reactors usually use a solid form heat carrier to supplement the heat in the transporting gas. Typically these heat carrying solids are inert silica sand or alumina-silica catalyst with a mean particle size in the range of 40 to 500 microns. Particles in this size range for sand have individual particle densities light enough to allow transport through the transport bed and heat carrier circulation system. However, the use of solid heat carrying solids in this size range makes the physical separation of the sand heat carrier and fine char particles generated by the process impossible. Therefore the char is typically burned as part of the fast pyrolysis process to provide thermal energy for the process and an ash residue generated which must then be removed by some means and disposed. Thus char recovery is not an option with these systems, and the loss of the char as a product can be a major economic drawback.

Additional major drawbacks associated with transport reactor systems include poor mixing of feedstock and heat carrier, essentially no particle ablation, poor heat transfer to the reacting particles, and high parasitic energy requirements. Therefore these systems also have limitations as to the potential to achieve high liquid yields and desired chemicals.

In an attempt to mitigate these limitations for transport bed reactors, a solid organic heat carrier has been used as is disclosed in U.S. Pat. No. 4,153,514, where hot char was used as a heat carrier. The organic heat carrier of the U.S. Pat. No. 4,153,514 does not provide the thermal, physical, and chemical properties required for effective fast pyrolysis reactions. The char material does not provide the heat demand, surface area for intimate contact, the rapid heat transfer between the heat carrier and feedstock, and the physical integrity for efficient and practical pyrolysis. Furthermore, the char participates in the reaction and is thus consumed and converted into undesirable side products as it passes through the reaction zone, thus a diminishing quantity of heat carrier is available as the char proceeds through the reaction zone. More importantly, due to the characteristics of char, it is impossible to achieve a sufficiently high ratio of heat carrier to feedstock to achieve fast pyrolysis.

U.S. Pat. No. 4,153,514 specifies the sand heat carrier mass to feedstock mass to range from 12:1 to 200:1 in order to obtain the desired heat transfer rates and feedstock residence times. Thus the parasitic loads to move the transport gas and inert solids through the bed can be quite high relative to most other types of fast pyrolysis reactors.

Moving Bed Reactors

Moving bed reactors are similar in design to transport bed reactors but use solid heat carriers for transferring heat to the feedstock particles. Although pneumatic methods can be used, mechanical means are more typically used to withdraw bed particles from the reactor, circulate bed particles outside the reactor to reheat the media and remove char, and reinject the bed particles into the reactor. Within the reactor gravity or mechanical means may be used to accomplish bed particle mixing and movement, which is typically downward.

Table 1 provides a comparison between two different kinds of heat carriers. Sand is commonly used in transport reactors and steel shot and other media have been used in moving bed reactors.

TABLE 1

Comparison of two different types of heat carrier

| Heat Carrier | Heat Capacity, Btu/lb-F | Bulk Density, lb/cf | Heat Capacity, Btu/cf-F. |
|---|---|---|---|
| Sand, dry | 0.191 | 88-100 | 16.8-19.1 |
| Stainless Steel shot, 0.125" dia | 0.11 | 280 | 30.8 |

In addition to the higher heat transport capability provided by relatively heavy media such as steel shot in moving beds, moving bed reactors have the advantages of significantly lower parasitic energy loads, simplicity of operation, and—depending partially on the choice of heat carrier—relatively low heat carrier mass to feedstock mass ratios.

Reactor Review Summary

A practical, economical, commercial thermal treatment process requires:
1) Relatively high yields of the liquid products,
2) Scalability of the process to industrial size,
3) Technical and business feasibility for industrial use.

In summary, a moving bed reactor can provide a method and apparatus with an inorganic heat carrier with its inherent ablative heat transfer properties for thermal treatment, including providing conditions for true fast pyrolysis processing and products therefrom.

In particular, the moving bed system and process provides a system that combines adequate reactor temperature, short residence time and rapid product cooling to achieve true fast pyrolysis with the required aspect of extremely rapid heat transfer to the feedstock particles. In order to effectively achieve sufficiently high heat transfer rates in a reactor system, direct ablative contact between the solid heat carrier (that is, the reactor wall or solid particles) and the feedstock is required. This type of heat transfer can only be accomplished in a reactor system if that system provides a relatively large amount of hot surface area to the reacting biomass, per unit time, per unit volume of reactor. If the heat transfer surface is relatively small, either the rate of heat transfer is reduced or the reactor can only process a relatively small amount of material per unit time per unit volume of reactor (with a significant negative effect on the economics of the reactor). Thus, the moving bed reactor fulfills the need for a system that utilizes the high bulk density of an inorganic heat carrier to allow a high loading (mass of heat carrier to mass of feed) to be achieved in a relatively small reactor volume in order to provide a very large heat transfer surface to be available to the feed.

The reactor of the present invention, which is described below in detail, meets these requirements and improves on prior art thermal treatment systems and reactors by providing a relatively simple, low cost and effective combination moving bed thermal treatment reactor system and moving bed filter.

One long-time major hurdle for thermochemical processes is the cleaning of contaminates such as tars and particulates from the gas and vapor product streams. Cleanup of gas streams from these thermochemical processes is important to prevent plugging and fouling of ducting, piping, and devices downstream of the gasification reactor. These contaminants may also poison or otherwise interfere with the operation of devices or other processes downstream of the reactor.

This cleanup is compounded by the temperatures of the gas and vapor streams, which can exceed 900° C. for thermochemical processes. Cleanup can be also compounded by the presence and stickiness of tars in the gas stream, especially if char particles are present, as char particles will increase the rate of buildup on ducting and other surfaces and can, under some circumstances, provide a catalytic effect.

What is considered an acceptable level of gas stream contamination may vary depending on the end use of the gas and vapor. For example, Basu in *Biomass Gasification and Pyrolysis, Practical Design and Theory* indicates that catalysts and fuel cells require very clean gas streams (0.02 mg/Nm3 for particulates and 0.1 mg/Nm3 for tar) to prevent binding, poisoning, or other interference with their operation. Treatments by catalysis are widely considered key processes for upgrading gas and liquid products from thermal treatment processes, thus solving the hot gas cleanup issues would greatly facilitate the commercialization of catalytic processes for gas and vapor upgrading purposes.

In the case of bio-oil vapors derived from a thermal treatment process, particulates in the gas/vapor stream can be composed of char, which contains the ash from the biomass. A portion of the ash contains mineral content, which can react with the vapor and reduce the final bio-oil yield. Therefore, all other things equal, decreasing the amount of char particulates in the gas stream will decrease these secondary reactions.

Over time, various hot gas cleanup methods have been developed and some are commercially available. Cyclones and swirl tubes have been used for particulate cleanup in gas streams with partial success. These devices work by imposing an artificial gravity field in the form of a centrifugal force on the gas stream particles.

The capture efficiency of well-engineered cyclones decreases rapidly for particles below 5 microns in size, with typically two or more well-designed cyclones in series required to achieve a filtration efficiency approaching 99% at the 5 micron particle size level. However, particulates in the gas stream can be as small as 0.1 micron, thus cyclonic devices alone will not achieve the necessary levels of particulate cleanup.

Other examples of commercial hot gas clean up technologies include ceramic filters and sintered metal filters. These filters operate in a manner similar to baghouses that are commonly used for control of fine particulates in gaseous emissions in industry. In practice, the gas stream is channeled through the filter material and the particulates are removed by passage through small pores in the filter that results in the buildup of a filter cake, which provides a further filtering action. Usually the filters must be periodically taken offline and the filter cake removed, typically by back flushing with a gas stream, or cleaning with chemicals, or other means. Because the ratio of pore area to surface area is relatively small, these filters require very large surface areas and, in the case of ceramic filters, can be fragile. In addition to their massive physical size, these filters are also very expensive; the capital cost of a ceramic or sintered metal filter system can equal the entire capital cost of the balance of the thermochemical process system.

Electrostatic precipitators (ESPs) are effective at removing aerosols and particulates that will take an electrical charge. These devices can also operate under high temperature conditions. Unfortunately, some of the thermal treatment liquid product in the gas stream can be in the form of aerosols and would be lost through the use of an ESP placed within or immediately after the reactor to remove gas stream particulates.

Prior art for gas cleanup includes fixed bed filter systems. An example of a fixed bed filter system is U.S. Pat. No. 4,744,964, which utilizes an agitated fixed bed of granular material to "purify" pyrolysis gases with simultaneous neutralization and dust separation. This method has trouble removing the filter cake effectively, even with the agitation.

Moving bed filters (MBFs) have been used with some success in removing particulates from gas streams from thermal treatment processes, including fast pyrolysis processes, outside the reactor, particularly when the MBFs are preceded by cyclones to remove most of the particulates before the MBF. The concept of the MBF as described further in U.S. Pat. No. 7,309,384 is to provide a self cleaning mechanism for the filter, so that the system can operate with significantly less down time. MBFs have a bed of moving filter material, which is typically some form of small aggregate that flows downward by gravity within an enclosed vessel housing the filter. Gas enters the filter either from the top, bottom, or side and typically exits opposite the gas' entry point. Solid gas contaminants captured in the filter bed are swept along with the filter material and are removed from the bed material externally in a separate operation, and the filter bed material recycled back to flow through the MBF again.

The choice of bed particle materials for MBFs is important as bed particles with low densities will become fluidized and, in the worst case, entrained in the exiting gas stream at high gas flowrates and thus limit the throughput and efficiency of the MBF. This limitation has been addressed by various methods, including using a screen against the top of the bed to keep the bed from fluidizing as described in U.S. Pat. No. 7,309,384.

U.S. Pat. No. 7,309,384 indicates that excessive gas pressure drop is a problem because of the small area available for gas exiting the filter and the gas pathway through the MBF. The method described thus requires special measures to mitigate gas pressure drop through the device.

Unless tar removal is the goal, all gas cleanup devices must be kept at temperatures above the dew point of tars and vapors to prevent them from condensing and building up on surfaces. In addition to insulation, and depending on their location in the process, the gas cleanup devices may require a heat source(s) and method of transferring heat to the devices. This requirement adds to the complexity and cost of the cleanup train, increases the physical size of the system, and in the case of portable systems, can add significant weight to the apparatus.

In summary, the traditional MBF as a separate operation downstream from the reactor, must have a mechanism for keeping the device hot, must have a mechanism for removing the filtered materials from the bed materials (usually conducted in a separate, external operation or by taking the device offline periodically), must have a mechanism for recycling the bed material back to the top of the MBF, and must have a separate mechanism for controlling bed depth.

All of the gas cleanup methods and apparatus discussed apply to gas cleaning systems downstream of the reactor—in other words—external to the reactor. External gas cleanup devices increase the length of the gas path to the liquid recovery systems, which increases gas pressure drop and increases the time for gas passage, resulting in more time for undesirable secondary reactions to occur with the vapor, resulting in reduced liquid yields and other problems.

A method whereby a hot gas cleanup system was built into a reactor would have several advantages. One attempt at combining hot gas cleanup system into a reactor is disclosed in U.S. Pat. No. 4,151,044 where a fast pyrolysis reactor is built into a cyclone. Fast pyrolysis reactors built in the form of cyclones have serious limitations since they must perform at least two tasks simultaneously—holding the pyrolysis reaction and separation of solids. Typically these two operations have their own optimal conditions and a compromise must be found. Therefore the overall system efficiency is compromised.

U.S. Pat. No. 7,202,389 describes a combined fast pyrolysis reactor and gas filtration system in an attempt to overcome these limitations by mounting a rotating filter directly on or in the gas exits of the cyclone. Thus the exiting gas is forced through the filter and particulates captured and removed from the gas stream. The rotating filter is cleaned by means of a fluid jet blowing in a reverse flow direction to the gas stream.

SUMMARY OF THE INVENTION

It is, therefore, an object of the present invention to provide a moving bed gasification/thermal treatment reactor with geometry in which moving bed reactor particles serve as both a moving bed filter and a heat carrier to provide thermal energy for thermal treatment reactions, such that the moving bed filter and the heat carrier are one and the same to remove solid particulates or droplets generated by thermal treatment processes or injected into the moving bed filter from other sources. The moving bed gasification/thermal treatment reactor includes a housing for a reactor chamber. The housing is composed of a reactor wall with a top wall and a base. A chute is provided in the top wall of the housing for the supply of moving bed reactor particles. The housing also includes sloping bottom walls adjacent a bottom of the reactor chamber of the reactor and extending from the reactor wall. The sloping bottom walls which meet adjacent the bottom of the reactor chamber of the reactor wherein the sloping bottom walls guide the moving bed reactor particles and captured char to the bottom of the reactor chamber of the reactor where it is removed by the removal augers. The top wall, reactor wall and sloping bottom walls define the reactor chamber. The reactor also includes moving bed reactor particles functioning as both a moving reactor bed and a heat carrier, a feedstock supply auger conveying feedstock into the reactor chamber, and a removal auger removing moving bed reactor particles and char resulting from the thermal treatment process. The reactor also includes a moving reactor bed composed of the moving bed reactor particles, the moving bed reactor particles flowing downward from an outlet of the chute by gravity to the bottom of the reactor chamber where the moving bed reactor particles are discharged from the bottom of the reactor chamber by the removal auger.

It is also an object of the present invention to provide a moving bed gasification/thermal treatment reactor wherein two removal augers are provided.

It is another object of the present invention to provide a moving bed gasification/thermal treatment reactor wherein the feedstock supply auger includes an auger tube with a tube bottom partially cut away to allow release of feedstock into the moving reactor bed of the moving bed reactor particles as feedstock is conveyed into the reactor by the feedstock supply auger.

It is a further object of the present invention to provide a moving bed gasification/thermal treatment reactor wherein the tube bottom of the auger tube has a gradually tapered opening.

It is also an object of the present invention to provide a moving bed gasification/thermal treatment reactor wherein a bottom half of the auger tube is cut away.

It is another object of the present invention to provide a moving bed gasification/thermal treatment reactor wherein the feedstock supply auger and removal auger are in a facing relationship causing interaction between the moving bed reactor particles and the feedstock particles in a manner facilitating the desired transfer of heat.

It is a further object of the present invention to provide a moving bed gasification/thermal treatment reactor wherein the reactor operates at a range of 350° C. to 800° C. such that upon feedstock contact with the moving bed reactor particles of the moving reactor bed the feedstock is immediately devolatilized under pyrolysis conditions forming hot gas and char products, with the char containing feedstock that has not been volatilized, and the hot gas expanding and pushing upward and outward through the downward flowing moving reactor bed which acts to filter solid contaminants from the hot gas.

It is also an object of the present invention to provide a moving bed gasification/thermal treatment reactor where the moving bed reactor particles are spherical.

It is another object of the present invention to provide a moving bed gasification/thermal treatment reactor wherein the moving bed reactor particles are stainless steel.

It is a further object of the present invention to provide a moving bed gasification/thermal treatment reactor wherein the moving bed reactor particles are ceramic.

It is also an object of the present invention to provide a moving bed gasification/thermal treatment reactor wherein the ratio of the mass flow rate of the moving bed reactor particles mass to the mass flow rate of the feedstock ranges from 6:1 to 150:1.

It is another object of the present invention to provide a moving bed gasification/thermal treatment reactor wherein an upper surface area of the moving reactor bed is larger than the area where a thermal treatment reaction occurs.

It is a further object of the present invention to provide a moving bed gasification/thermal treatment reactor wherein the sloping bottom walls of the reactor create a bottom angle of 45 degrees from the horizontal.

It is also an object of the present invention to provide a moving bed gasification/thermal treatment reactor wherein the sloping bottom walls of the reactor create a bottom angle ranging from 30 to 60 degrees from the horizontal.

It is another object of the present invention to provide a moving bed gasification/thermal treatment reactor wherein moving bed reactor particles flow downward along the sloping bottom walls of the reactor leading to the bottom of the reactor chamber of the reactor, thus sweeping captured particulates downward with the moving reactor bed whose moving bed reactor particles simultaneously pick up heat from a surface of the sloping bottom walls leading to the bottom of the reactor chamber reactor.

It is a further object of the present invention to provide a moving bed gasification/thermal treatment reactor wherein the reactor wall of the reactor are heated by jacketed reactor walls which can hold preheated flue gas, air, or other fluids for reactor heating; with an opening between a heating chamber beneath the reactor chamber and a heating chamber defined by the jacketed reactor walls to facilitate convective heat transfer between the heating chamber defined by the jacketed reactor walls and the heating chamber beneath the reactor chamber.

It is also an object of the present invention to provide a moving bed gasification/thermal treatment reactor wherein a gas disengagement area is maintained above the upper surface of the moving reactor bed to serve as a plenum to capture the gas that has flowed through the moving reactor bed and direct it to holes in the jacketed reactor walls near the top of the reactor.

It is another object of the present invention to provide a moving bed gasification/thermal treatment reactor wherein the formation of the gas disengagement area within the reactor is facilitated by the angle of the upper surface of the moving reactor bed, product gas exits the reactor through holes and into a plenum that is created out of part of the jacketed reactor walls.

It is a further object of the present invention to provide a moving bed gasification/thermal treatment reactor wherein the reactor bed serves as a filter bed for gases generated from within or injected in the moving reactor bed.

It is also an object of the present invention to provide a moving bed gasification/thermal treatment reactor wherein a feedstock entry point is at a bed depth sufficient to provide a gas path length for efficient filtering action of the gases generated by the pyrolysis process or injected into the moving reactor bed from other sources.

It is another object of the present invention to provide a moving bed gasification/thermal treatment reactor wherein a depth of the moving reactor bed is adjusted by changing a distance between the outlet of the chute of the moving bed reactor particles and the feedstock supply auger in order to increase the path for product gas flow through the moving reactor bed and increase the surface area of the moving reactor bed.

It is a further object of the present invention to provide a moving bed gasification/thermal treatment reactor wherein the chute for the moving bed reactor particles is vertically adjustable.

It is also an object of the present invention to provide a moving bed gasification/thermal treatment reactor wherein the moving bed reactor particles have a minimum density of 181 pounds per cubic foot.

Other objects and advantages of the present invention will become apparent from the following detailed description when viewed in conjunction with the accompanying drawings, which set forth certain embodiments of the invention.

DETAILED DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

With reference to FIGS. 1, 2, 3 and 4, a moving bed thermal treatment reactor 9 is disclosed. The moving bed thermal treatment reactor 9 of the present invention is provided with geometry in which the moving bed reactor particles 15 serve as both a moving bed filter and a heat carrier to provide thermal energy for thermal treatment reactions. With this in mind, the terms "moving bed reactor particles", "moving bed filter particles", "heat carrier", "heat carrier particle(s)" and "moving bed particle(s)" are thus used interchangeably herein depending upon the function being performed by the moving bed reactor particles.

The present moving bed thermal treatment reactor 9 functions to provide both moving bed gasification and pyrolysis, and is designed for use in conjunction with the systems disclosed in prior U.S. patent application Ser. No. 11/480,914, entitled "METHOD AND SYSTEM FOR ACCOMPLISHING FLASH OR FAST PYROLYSIS WITH CARBONACEOUS MATERIALS", which is incorporated by reference herein and U.S. patent application Ser. No. 11/480,915, entitled "METHOD AND SYSTEM FOR ACCOMPLISHING FLASH OR FAST PYROLYSIS WITH CARBONACEOUS MATERIALS", which is incorporated by reference herein.

Briefly, and as will be appreciated based upon the following detailed disclosure, the reactor 9 includes a housing 10 composed of a cylindrical reactor wall 8 with a top wall 30 and a base 31. A chute 16 is provided in the top wall 30 of the housing 10 for the supply of moving bed reactor particles 15. The housing 10 also includes sloping bottom walls 20 adjacent a bottom 17 of the reactor chamber 32 of the reactor 9. The bottom walls 20 extend toward the center of the reactor chamber 32 from opposed sides of the reactor wall 8. The sloping bottom walls 20, which meet adjacent the bottom 17 of the reactor chamber 32 of the reactor 9, guide the moving bed reactor particles 15 and the captured char to the bottom of the reactor 9 where it is removed by the removal augers 3a, 3b. The reactor chamber 32 of the present reactor 9 is defined by the top wall 30, the reactor will 8 and sloping bottom walls 20. As mentioned above, the reactor 9 also includes moving bed reactor particles 15 functioning as both a moving reactor bed 1 and a heat carrier for the thermal treatment of feedstock. As such, the reactor 9 also includes a feedstock supply auger 4 conveying feedstock into the reactor chamber 32 and a removal auger(s) 3a, 3b removing char, moving bed reactor particles 15 and other elements from the reactor chamber 32. The reactor 9 also includes a moving reactor bed 1 composed of the moving bed reactor particles 15. The moving bed reactor particles 15 flow downward from an outlet 22 of the chute 16 by gravity to the bottom 17 of the reactor chamber 32 of the reactor 9 where the moving bed reactor particles 15 are discharged from the bottom 17 of the reactor chamber of the reactor 9 by the removal auger(s) 3a, 3b.

Figure 1:
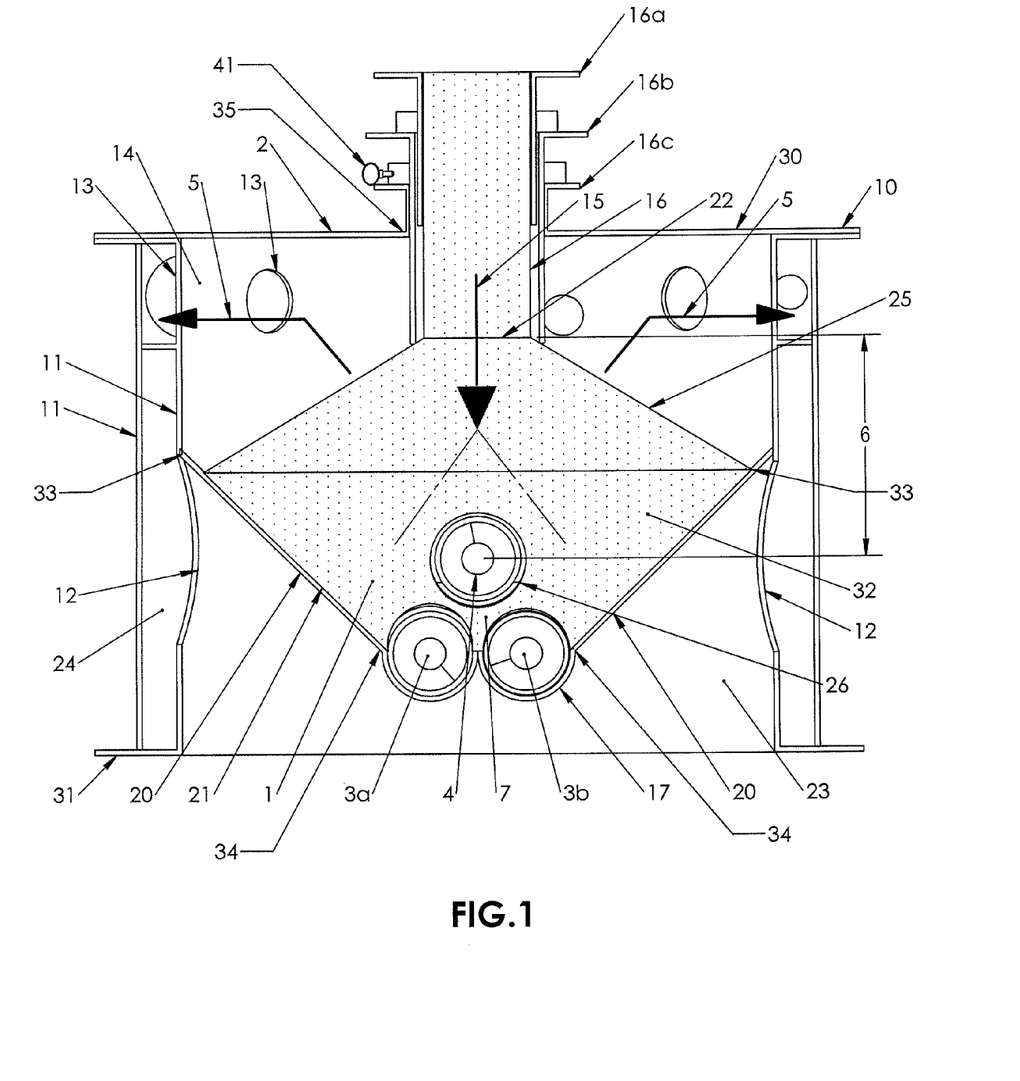
FIG. 1 is a schematic of a moving bed gasification/thermal treatment reactor in accordance with an embodiment of the present invention.
Figure 2:
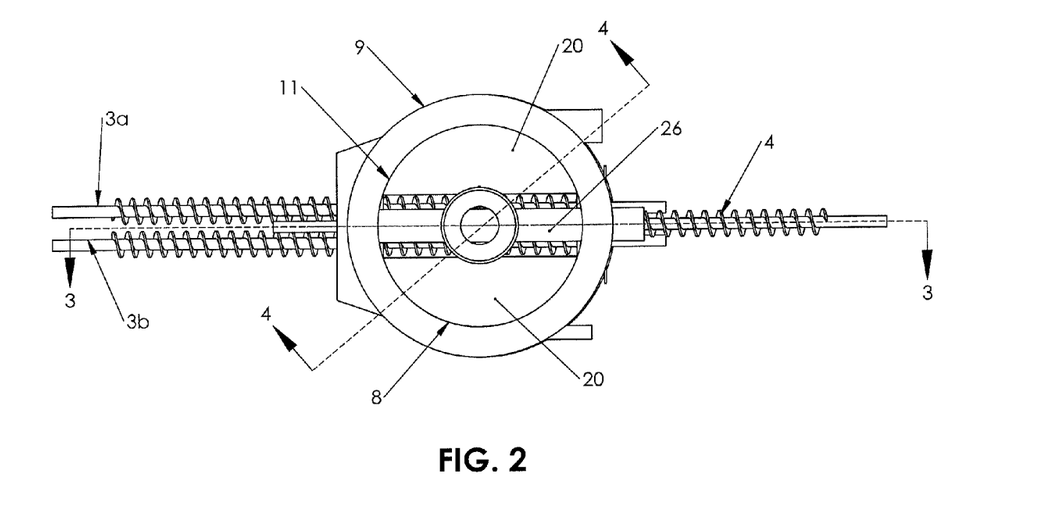
FIG. 2 is a top view of the moving bed gasification/thermal treatment reactor in accordance with an embodiment of the present invention.
Figure 3:
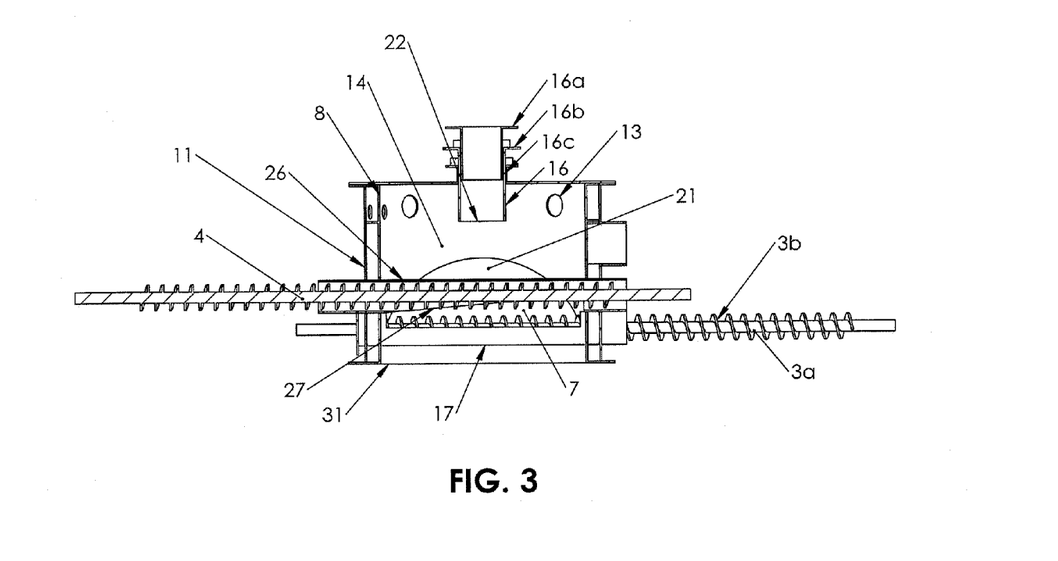
FIG. 3 is a sectional side view of the moving bed gasification/thermal treatment reactor along the line 3-3 in FIG. 2.
Figure 4:
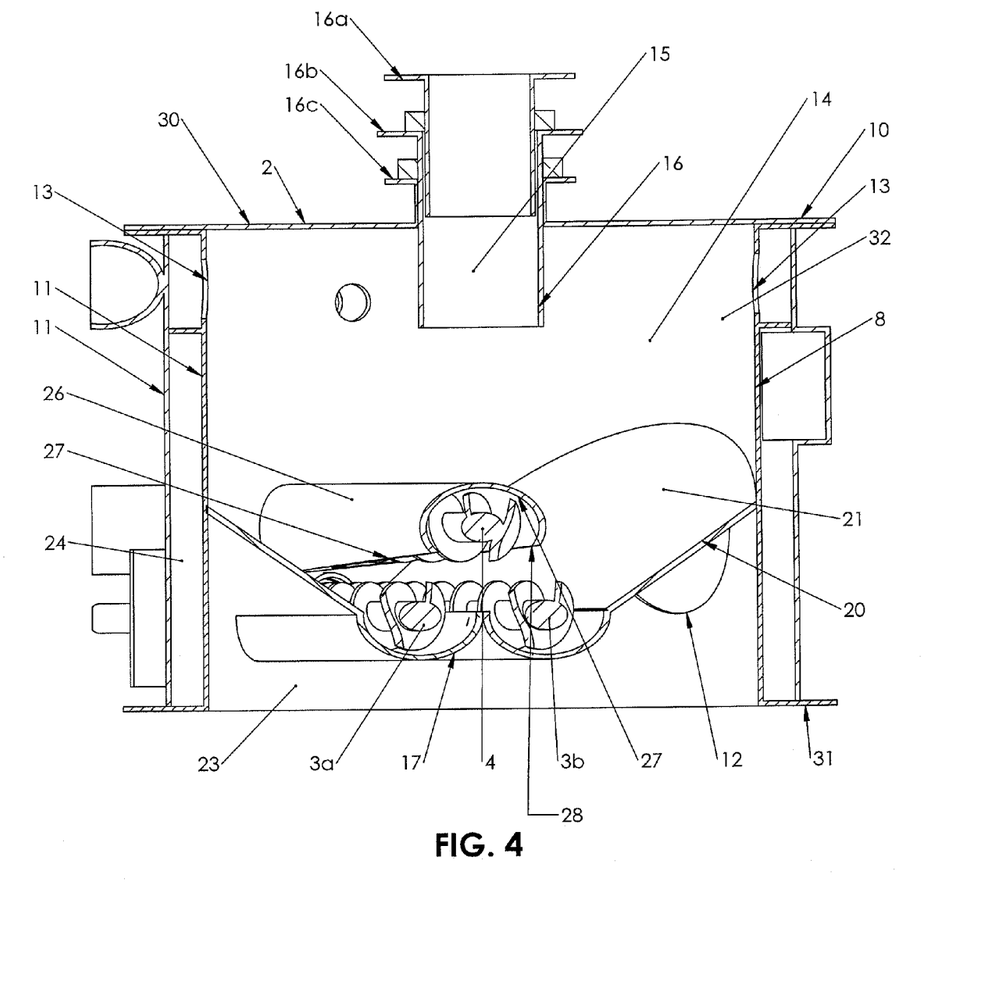
FIG. 4 is a cross sectional side view of the moving bed gasification/thermal treatment reactor along the line 4-4 in FIG. 2.

A cross section of the reactor 9 perpendicular to the feedstock supply auger 4 is shown in FIG. 1. The reactor 9 is in the form of a vertical cylinder, which is the preferred embodiment. FIG. 2 is a top view of the same reactor 9. FIG. 3 is a cross sectional side view of the reactor 9 pictured in FIGS. 1 and 2 along the line 3-3 in FIG. 2. FIG. 4 is a cross sectional side view of the reactor 9 pictured in FIGS. 1 and 2 along the line 4-4 in FIG. 2. It is appreciated FIGS. 2, 3 and 4 do not show the moving reactor bed 1 within the reactor 9.

As shown in FIG. 1, the moving bed thermal treatment reactor 9 includes a moving reactor bed 1 composed of moving bed reactor particles 15. As will be appreciated based upon the following disclosure the moving bed reactor functions as both a moving bed filter and a heat carrier to provide thermal energy for thermal treatment reactions. The moving bed reactor particles 15 flow downward under the force of gravity from a chute 16 formed in the top 2 of the reactor 9 to form the moving reactor bed 1 within the reactor 9. Once the moving bed reactor particles 15 fall to the bottom 17 of the reactor chamber 32 of the reactor 9, they are discharged from the bottom 17 of the reactor chamber 32 of the reactor 9 with the removal augers 3a, 3b.

The housing 10 of the reactor 9 generally includes a cylindrical reactor wall 8 with a top wall 30 and a base 31. Adjacent to the bottom 17 of the reactor chamber 32 of the reactor 9, and extending from the reactor wall 8, are first and second sloping bottom walls 20 which meet at the bottom 17 of the reactor chamber 32 of the reactor 9. In accordance with a preferred embodiment, the first and second sloping bottom walls 20 are flat planar surfaces with circular edges 33 that are secured to the reactor wall 8 and straight edges 34 that meet in an opposed relationship at the center of the reactor 9, wherein the circular edges 33 are vertically elevated relative to the straight edges 34. The provision of the sloping bottom walls 20 configures the bottom portion of the reactor 9 such that it takes the shape of an inverse triangular configuration when viewed along the cross section shown in FIG. 1, with two sloping bottom walls 20 meeting at the removal augers 3a, 3b positioned at the bottom 17 of the reactor chamber 32. The top wall 30, the reactor wall 8 and the first and second sloping bottom walls 20 define the reactor chamber 32.

As will be appreciated based upon the following disclosure, the sloping bottom walls 20 guide the moving bed reactor particles 15 and the captured char to the bottom 17 of the reactor chamber 32 of the reactor 9 where the char and moving bed reactor particles 15 are removed by the removal augers 3a, 3b. Although two removal augers 3a, 3b are disclosed in accordance with a preferred embodiment, it is appreciated a single such removal auger or more than two removal augers could be employed. The removal of the moving bed reactor particles 15 and char from the reactor 9 is ensured by shaping the bottom 17 of the reactor chamber 32 of the reactor 9 to conform with the shape of the removal augers 3a, 3b, which enable the removal augers 3a, 3b to grab and draw all the moving bed reactor particles 15 and char from the reactor 9.

While the bottom 17 of the reactor chamber 32 of the reactor disclosed herein is of an inverse triangular configuration with two sloping bottom walls 20 meeting at the removal augers 3a, 3b positioned at the bottom 17 of the reactor chamber 32, as will be discussed below in greater detail, it is appreciated a conical shape funneling the heat carrier, that is, moving bed reactor particles, to the removal augers for transport to a discharge opening for removal could also be used. The removal device beneath the heat carrier discharge point could be an auger or augers or some other device, and these augers could be separated from each other instead of together as shown. Varying the speed of the removal augers can be used to adjust the downward flowrate of the heat carrier in the moving reactor bed.

In operation, feedstock enters the reactor chamber 32 slightly above the bottom 17 of the reactor chamber 32 of the reactor 9 (but above at least some of the heat carrier/moving bed reactor particles 15 and the removal augers 3a, 3b, and close to the horizontal center 7 of the reactor 9) through a conveyor of some type. In accordance with a preferred embodiment, the feedstock is conveyed to the reactor 9 under the control of a feedstock supply auger 4. While a single feedstock supply auger is disclosed, it is appreciated additional feedstock supply augers may be employed. It is also appreciated that there may be baffles (not shown) placed above the feedstock entry point to create a void to facilitate bed particle flow or for other reasons.

Referring to FIG. 4, the feedstock supply auger 4 conveying the feedstock into the reactor chamber 32 includes an auger tube 26 part of which has been cut away. In particular, feedstock supply auger 4 has the bottom of the tube 26 partially cut away to allow release of the feedstock into the moving reactor bed 1 of heat carrier 15 as feedstock is conveyed into the reactor 9 by the feedstock supply auger 4. In one embodiment, the bottom of auger tube 26 inside the reactor 9, that is, within the reactor chamber 32, has a gradually tapered opening 27, starting from the reactor wall 8 closest to the entry point of feedstock supply auger 4 into the reactor 9 until the tapered opening 27 spans the portion of auger tube 26 inside the reactor chamber 32. In accordance with a preferred embodiment, the entire bottom half 28 of the auger tube 26 is cut away for at least a portion of the length of the auger tube 26 within the reactor chamber. To ensure full feedstock release and center the reaction in the horizontal center of the reactor chamber, the entire bottom half of auger tube could be cut away from the center of the reactor chamber to the point at which the tapered opening fully expands resulting in the entire bottom half of the auger tube being cut away.

Feedstock entry into the reactor can also be assisted or conducted with inert gas flows at the point of feedstock entry into the reactor such as provided by nitrogen, non-condensable process gas, or other non-oxidative gases.

The feedstock is injected into the moving reactor bed 1 whose heat carrier 15 has been preheated to the desired reaction temperature exterior to the reactor, interior to the reactor, or by a combination of these methods, wherein a combination of heating mechanisms is contemplated in accordance with a preferred embodiment. It is preferred that heating mechanisms disclosed in U.S. patent application Ser. Nos. 11/480,914 and 11/480,915 be employed in accordance with the present embodiment of the present invention.

Upon the injection of the feedstock into the reactor 9, the feedstock, which is preferably in the form of particles with relatively thin thickness (typically less than 0.125-inch) for interaction with the heat carrier 15, are immediately mixed with the heat carrier particles 15 of the moving reactor bed 1. Due to the relatively small sizes of the heat carrier particles 15 and feedstock particles, coupled with immediate and rapid mixing, heat is transferred efficiently and quickly from the heat carrier particles 15 to the feedstock particles by ablation to accomplish fast pyrolysis and other thermal treatments.

Rapid mixing of the feedstock and heat carrier particles 15 is accomplished mechanically by interaction caused as a result of positioning of the feedstock supply auger 4 and removal augers 3a, 3b. In particular, the feedstock supply auger 4 and removal augers 3a, 3b are in facing relationship, with the opening 27 of the feedstock supply auger 4 positioned vertically above the removal augers 3a, 3b. This facing relationship of the feedstock supply auger 4 and the removal augers 3a, 3b cause interaction between the heat carrier particles 15 and the feedstock particles in a manner facilitating the desired transfer of heat. The design distance between the feedstock supply auger 4 and the removal augers 3a, 3b will depend on several parameters, including heat carrier and feedstock flow rates, operating temperatures, feedstock volatility, and other factors. It is, however, appreciated that other mechanisms for mixing may also be employed, including modifications to any of the augers to facilitate mixing. Mixing can also be assisted by a flow of inert gas used to facilitate the injection of feedstock into the reactor—if such gas is used. It is appreciated, however, that by orienting the feedstock supply auger 4 and the removal augers 3a, 3b such that they move material in the same linear direction (see FIG. 2), greater mixing is achieved. In addition, better mixing and heat transfer by the movement of the heat carrier particles 15 along the hot surface of the sloping bottom walls 20 is achieved by operating the present system such that the removal augers 3a, 3b operate with opposite rotational characteristics. That is, and in accordance with a preferred embodiment, the left side removal auger 3a in FIG. 1 rotates clockwise and the tight removal auger 3b rotates counter-clockwise in order to draw the heat carrier particles 15 into the removal augers 3a, 3b and move the material against the hot reactor bottom walls 20, and effect better mixing.

In the case of fast pyrolysis for example, the reaction is conducted in the relative absence of air at temperatures typically in the range of 350° C. to 800° C. Upon feedstock contact with the hot heat carrier particles 15 of the moving reactor bed 1 the feedstock is immediately devolatilized under fast pyrolysis conditions and gas and char products formed, with the char containing the materials that have not been volatilized. The hot gas 5 expands and pushes its way upward and outward through the downward flowing moving reactor bed 1 which acts to filter char, droplets, and solid contaminants, in particular from the hot gas 5. In this way, the moving reactor bed 1 filters various elements entrained in the hot gas 5 including char, droplets and solid contaminants.

The efficiency of filtration is affected by the nominal size of individual droplets or particulates in the gas stream, reactor heat carrier bed depth 6, the mass flow rate of the gas stream through the moving reactor bed 1, heat carrier particle 15 size and heat carrier particle 15 shape (which controls bed void space), heat carrier particle 15 flowrate, and other factors. The moving reactor bed 1 can use a variety of heat carrier particle 15 sizes and shapes; heat carrier particles 15 do not have to be uniform in shape or size so long as they provide the desired flow and filtration characteristics. However, heat carrier particles 15 that are as close as possible to spherical are the preferred embodiment, but other shapes such as cylinders with an L/D aspect ratio close to 1 and other shapes are possible.

A variety of moving bed reactor particles 15, that is the dual functioning moving bed particles/heat carrier particles, materials can be used (e.g., gravel), so long as they stand up to the physical and chemical environment and have the requisite density. Likewise, the filtration system can operate over a wide range of temperatures, within the constraints of gas stream dew points, materials of construction, and other factors. For example, in accordance with a preferred embodiment, stainless steel shot of 0.08-inch to 0.375-inch nominal diameter is used as the moving bed reactor particles and functions as both moving bed particles in filtering the gas stream and heat carrier particles in heating the feedstock for thermal treatment, although other sizes may be used and may be more advantageous depending on process and other conditions. The selection of the size of the moving bed particles partially depends on the scale of the thermal treatment system, with smaller moving bed particle sizes corresponding to smaller scale thermal treatment systems. The moving bed reactor particles mass flow rate to feedstock mass flow rate ratios can range from 6:1 to 150:1, with ratios on the low end most typical.

As shown in FIG. 1, in the preferred embodiment, the reactor 9 is designed so that the upper surface 25 area of the moving reactor bed 1 is much larger than the area where the thermal treatment reaction occurs near the horizontal center 7 of the reactor chamber 32 of the reactor 9. The area of the upper surface 25 of the moving reactor bed 1 is a result of the height difference between the entry point of the moving bed reactor particles 15 into the reactor 9, the removal points for the moving bed reactor particles 15 from the reactor bottom 17, and the angle of repose of the moving bed reactor particles 15.

As previously discussed, the sloping bottom walls 20 funnel the heat carrier, that is, moving bed reactor particles 15, to the removal augers 3a, 3b for transport to a discharge opening for removal. In accordance with a preferred embodiment of the present invention, the sloping bottom walls 20 of the reactor 9 create a bottom angle of 45 degrees from the horizontal as shown in FIGS. 1, 3 and 4, which is one embodiment for 0.125-inch diameter stainless steel shot as the heat carrier. This angle may be adjusted to compensate for more viscous bed particle flow caused by less spherically shaped reactor bed particles 15, or from filter cake buildup, or for other reasons. Reactor chamber bottom angles typically ranging from 30 to 60 degrees may be used, although even flat bottomed reactors with a mechanical mechanism for removing heat carrier particles could be used. Shallower reactor bottom angles that will still provide the desired bed particle flow characteristics are preferred. Shallower angles will provide a larger upper surface to the moving reactor bed, which decreases gas velocity and provides more efficient filtration by the moving reactor bed.

Thus, and during operation of the present reactor, as the product gas 5 resulting from the pyrolysis of the feedstock flows upward and outward through the moving reactor bed 1 the gas velocity decreases. As described by S. C. Saxena, et al., in *Particulate Removal from High-Temperature, High-Pressure Combustion Gases*, this decrease in gas velocity is essential for good filtration efficiency. Concomitantly the heat carrier particles 15 making up the moving reactor bed 1 are flowing downward and ultimately inward. Eventually a high percentage of heat carrier particles 15 flow downward along the sloping bottom walls 20 of the reactor 9 leading to the bottom 17 of the reactor chamber of the reactor 9, thus sweeping the captured char/contaminate particulates downward with the moving reactor bed 1 whose heat carrier particles 15 simultaneously pick up heat from the surface 21 of the sloping bottom walls 20 leading to the bottom 17 of the reactor chamber of the reactor 9. As discussed above, char particles and heat carrier particles 15 are removed from the bottom 17 of the reactor 9 by the removal augers 3a, 3b.

It is appreciated that although the disclosed embodiment includes a reactor 9 with a vertical cylindrical outside reactor wall 8, other shapes can be used. The preferred embodiment is believed to provide the most uniform flow of heat carrier particles 15 where feedstock is injected into the moving reactor bed 1 from a relatively singular point near the horizontal center 7 of the reactor 9. However, multiple feedstock injection points and multiple heat carrier injection points can be used which may be more advantageous for other reactor configurations such as vertically oriented, rectangular shaped moving bed reactors.

The depth 6 of the moving reactor bed 1, that is, the distance from the outlet 22 of the chute 16 to the center of the feedstock supply auger 4, is one way to control filtration efficiency. This distance can be controlled by regulating the height of the discharge point, that is, the outlet 22 of the chute 16 of the heat carrier particles 15 into the reactor chamber 32 of the reactor 9 relative to the feedstock injection point at the feedstock supply auger 4 or points into the reactor 9. The downward sloping bottom walls 20 at the bottom 17 of the reactor chamber of the reactor 9 channel the heat carrier particles 15 and anything captured by the moving reactor bed 1 downward into the removal augers 3a, 3b at the bottom 17 of the reactor chamber of the reactor 9, which remove the char and heat carrier particles 15. Due to the sloping bottom walls 20 of the reactor chamber bottom 17 and given a large enough reactor diameter in the preferred embodiment, changing the depth 6 of the moving reactor bed 1 also provides a mechanism for increasing the area of the upper surface 25 of the moving reactor bed 1 relative to the area where the thermal treatment reactions occur, that is, the pyrolysis reaction occurring between the feedstock supply auger 4 and the removal augers 3a, 3b. This increase in the area of the upper surface 25 of the moving reactor bed 1 will cause a further decrease in gas velocity through the moving reactor bed 1, thus further improving filtration efficiency, without significantly increasing pressure drop of the product gas through the moving reactor bed 1. Process scaleup can be facilitated by adjusting the entry point for the feedstock supply auger 4 or points into the moving reactor bed 1 to maintain the same gas path distance through the moving reactor bed 1.

Referring to FIG. 1, and in accordance with an embodiment of the present invention, the depth of the moving reactor bed 1 is adjusted by changing a distance between the outlet 22 of the chute 16 and the feedstock supply auger 4 in order to increase the path for product gas flow through the bed. This is achieved by providing a chute 16 that can be longitudinally adjusted within the top wall 30 of the reactor 9. The chute 16 consists of three concentric vertical chute members (16a, 16b, 16c) each sealed between them with vapor seals (not shown) and nested together through a flanged opening 35 formed in the top wall 30. Chute members 16a and 16c are fixed but the middle chute member 16b can be vertically adjusted between the chute member 16a and 16c by selectively securing it at different heights through various selective frictional securing mechanisms, for example, coupling bolt(s) 41.

Fluidization and entrainment of the heat carrier particles 15 in the gas stream exiting the reactor 9 is prevented without the necessity of screens or other means by the use of the present moving reactor bed 1 consisting of moving bed reactor particles 15 composed of bed materials with relatively high individual particle densities, such as stainless steel shot in the preferred embodiment. Table 2 gives a comparison between two materials sometimes used for moving bed reactor particles in moving bed filters or moving bed reactors, including stainless steel shot. Table 2 shows that for soda-lime glass beads and stainless steel shot of the same nominal diameter, the stainless steel has an individual particle density roughly 25 times that of soda-lime beads. In accordance with a preferred embodiment, the moving bed reactor particles 15 will have a minimum density of 181 pounds per cubic foot so as to ensure they drop in a desired manner from the chute 16 to the sloping bottom walls 20, and ultimately into the removal augers 3a, 3b. Thus, in addition to being an effective suppressor of bed fluidization tendencies, the stainless steel shot can also carry more heat per unit of volume for a given temperature as previously shown in Table 1.

TABLE 2

Comparison of moving bed materials

| Description | Heat capacity, Btu/lb F. | Individual particle density, lb/particle |
| --- | --- | --- |
| Soda lime glass beads, 3 mm dia | 0.20 | 0.00008 |
| Stainless Steel Shot, 3 mm dia | 0.11 | 0.0023 |

Once the heat carrier particles 15 are removed from the reactor 9, the char, contaminates, or other materials captured in the moving reactor bed 1 can be removed from the heat carrier particles 15 by screening, burning, or other means, and the heat carrier particles 15 reheated and recycled back to the chute 16 at the top 2 of the reactor 9 by various means. Unlike most other thermal treatment processes, the method described herein provides a method for recovery of the char, if desired, a product which can be quite valuable and can significantly improve the economics of the overall process.

The exterior reactor wall 8 of the reactor 9 can be heated by various means to maintain or help maintain desired reactor temperatures. FIG. 1 discloses jacketed reactor walls 11 which can hold preheated flue gas, air, or other fluids for reactor heating with an opening 12 between the heating chamber 23 beneath the reactor chamber 32 and the heating chamber 24 defined by the jacketed reactor walls 11 to facilitate convective heat transfer between the heating chamber 24 defined by the jacketed reactor walls 11 and the heating chamber 23 beneath the reactor chamber 32. Electrical heaters or other methods could also be used to supply heat to the reactor.

The reactor 9 configuration and movement of the heat carrier particles 15 against the bottom 17 of the reactor chamber 32 of the reactor 9 (and sloping bottom walls 20 in one embodiment) allows virtually all of the required heat for the thermal treatment reactions to be supplied to the heat carrier particles 15 when these reactor surfaces are heated on their exterior. By heating the exterior 8 of the reactor 9, the amount of heat carrier required and the amount of heat required to be carried by the heat carrier particles 15 can be significantly reduced, so that heat carrier particles 15 to feedstock mass flow ratios in the range of 6:1 can be utilized without loss of reactor efficiency. This drop in mass ratio is accompanied by a corresponding drop in the mechanical energy required for cycling the heat carrier particles 15 to and from the reactor 9 and through the char or contaminates removal operations.

A gas disengagement area is maintained above the upper surface 25 of the moving reactor bed 1 to serve as a plenum 14 to capture the gas that has flowed through the moving reactor bed 1 and direct it to holes 13 in the inner surface of the jacketed reactor walls 11 near the top 2 of the reactor 9. The formation of this gas capturing area within the reactor 9 is facilitated by the angle of the upper surface 25 of the moving reactor bed 1. Product gas 5 exits the reactor 9 through holes 13 and into a plenum 14 that is created out of part of the jacketed reactor walls 11 in the embodiment shown.

The removal of the gas from the reactor can be facilitated with a sweep gas stream through the reactor. The addition of the sweep gas can be designed to maintain low pressure drops in the reactor and to more effectively remove gas from the reactor. This sweep gas can be a gas or part of a gas utilized to facilitate feeding feedstock into the reactor, or it can be injected into the reactor in various locations. The sweep gas can consist of nitrogen, process product gas, or other suitably non-oxidative gas with very minimal or no oxygen content. In the preferred embodiment, the sweep gas can be circulated through the plenum formed by the upper chamber between the jacketed reactor walls 11 and thereby provide minimal disturbance to the upper surface 25 of the moving reactor bed 1.

Since the gas filtration operation is a single operation, the gas stream pressure drop is significantly reduced in comparison to a hot gas cleanup system consisting of several devices. The gas pathway through the bed is relatively short and does not require a change in direction, further mitigating pressure drop.

The invention described thus provides a highly efficient one-step filtration operation within the reactor that is continuously self-cleaning. No additional mechanical parts are required as the moving bed reactor process, coupled with a char removal operation which is inherent in the thermal treatment process, already performs the functions of circulating and reheating the heat carrier particles. Since filtration is performed within the reactor, no additional heat (or heating device) is required to keep the filtration system and gas stream above the dew point of tars and vapors. The simplicity of the filtration system coupled with the reactor operations decreases overall system capital and operating costs, without a loss of efficiency.

If desired, an additional moving or stationary bed can be created above the first moving reactor bed to perform additional filtration, or to provide a bed for catalysts, or for other reasons. This bed could be supported on perforated metal or some other suitable method and have a bottom slope that would roughly parallel the slope of the reactor bed beneath it in its preferred embodiment. The second bed could be against the top of the moving reactor bed or separated some distance from the reactor bed, which is the preferred embodiment.

One benefit of this secondary, upper moving bed is that in comparison to the liquid phase, the vapor and gas phase is a more effective medium for catalytic reactions. Thus an additional vaporization step could be avoided later. The proximity of the catalyst to the gas generation point minimizes the time for secondary reactions to occur or for the gas to cool and condense, which could cause blinding of the catalysts.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A moving bed gasification/thermal treatment reactor with geometry in which moving bed reactor particles serve as both a moving bed filter and a heat carrier to provide thermal energy for thermal treatment reactions, such that the moving bed filter and the heat carrier are one and the same to remove solid particulates or droplets generated by thermal treatment processes or injected into the moving bed from other sources, the reactor comprising:
   a housing for a reactor chamber, the housing being composed of a reactor wall with a top wall and a base, a chute is provided in the top wall of the housing for the supply of moving bed reactor particles, the housing also includes sloping bottom walls adjacent a bottom of the reactor chamber of the reactor and extending from the reactor wall, the sloping bottom walls which meet adjacent the bottom of the reactor chamber of the reactor wherein the sloping bottom walls guide the moving bed reactor particles and captured char to the bottom of the reactor chamber of the reactor where it is removed by the removal augers, the top wall, reactor wall and sloping bottom walls defining the reactor chamber;
   moving bed reactor particles functioning as both a moving reactor bed and a heat carrier;
   a feedstock supply auger conveying feedstock into the reactor chamber;
   a removal auger removing moving bed reactor particles and char resulting from the thermal treatment process; and
   a moving reactor bed composed of the moving bed reactor particles and serving as both a moving bed filter and a heat carrier to provide thermal energy for thermal treatment reactions, the moving bed reactor particles flow downward from an outlet of the chute by gravity to the bottom of the reactor chamber where the moving bed reactor particles are discharged from the bottom of the reactor chamber by the removal auger;
   wherein the feedstock supply auger and removal auger are in a facing relationship causing interaction between the moving bed reactor particles and the feedstock particles in a manner facilitating the desired transfer of heat.

2. A moving bed gasification/thermal treatment reactor with geometry in which moving bed reactor particles serve as both a moving bed filter and a heat carrier to provide thermal energy for thermal treatment reactions, such that the moving bed filter and the heat carrier are one and the same to remove solid particulates or droplets generated by thermal treatment processes or injected into the moving bed from other sources, the reactor comprising:
   a housing for a reactor chamber, the housing being composed of a reactor wall with a top wall and a base, a chute is provided in the top wall of the housing for the supply of moving bed reactor particles, the housing also includes sloping bottom walls adjacent a bottom of the reactor chamber of the reactor and extending from the reactor wall, the sloping bottom walls which meet adjacent the bottom of the reactor chamber of the reactor wherein the sloping bottom walls guide the moving bed reactor particles and captured char to the bottom of the reactor chamber of the reactor where it is removed by the removal augers, the top wall, reactor wall and sloping bottom walls defining the reactor chamber;
   moving bed reactor particles functioning as both a moving reactor bed and a heat carrier;
   a feedstock supply auger conveying feedstock into the reactor chamber;
   a removal auger removing moving bed reactor particles and char resulting from the thermal treatment process; and
   a moving reactor bed composed of the moving bed reactor particles and serving as both a moving bed filter and a heat carrier to provide thermal energy for thermal treatment reactions, the moving bed reactor particles flow downward from an outlet of the chute by gravity to the bottom of the reactor chamber where the moving bed reactor particles are discharged from the bottom of the reactor chamber by the removal auger;
   wherein the reactor wall of the reactor is heated by jacketed reactor walls which can hold preheated flue gas, air, or other fluids for reactor heating with an opening between a heating chamber beneath the reactor chamber and a heating chamber defined by the jacketed reactor walls to facilitate convective heat transfer between the heating chamber defined by the jacketed reactor walls and the heating chamber beneath the reactor chamber.

3. The moving bed gasification/thermal treatment reactor according to claim 2, wherein a gas disengagement area is maintained above the upper surface of the moving reactor bed to serve as a plenum to capture the gas that has flowed through the moving reactor bed and direct it to holes in the jacketed reactor walls near the top of the reactor.

4. The moving bed gasification/thermal treatment reactor according to claim 3, wherein the formation of the gas disengagement area within the reactor is facilitated by the angle of the upper surface of the moving reactor bed, product gas exits the reactor through holes and into a plenum that is created out of part of the jacketed reactor walls.

5. A moving bed gasification/thermal treatment reactor with geometry in which moving bed reactor particles serve as both a moving bed filter and a heat carrier to provide thermal energy for thermal treatment reactions, such that the moving bed filter and the heat carrier are one and the same to remove solid particulates or droplets generated by thermal treatment processes or injected into the moving bed from other sources, the reactor comprising:

a housing for a reactor chamber, the housing being composed of a reactor wall with a top wall and a base, a chute is provided in the top wall of the housing for the supply of moving bed reactor particles, the housing also includes sloping bottom walls adjacent a bottom of the reactor chamber of the reactor and extending from the reactor wall, the sloping bottom walls which meet adjacent the bottom of the reactor chamber of the reactor wherein the sloping bottom walls guide the moving bed reactor particles and captured char to the bottom of the reactor chamber of the reactor where it is removed by the removal augers, the top wall, reactor wall and sloping bottom walls defining the reactor chamber;

moving bed reactor particles functioning as both a moving reactor bed and a heat carrier;

a feedstock supply auger conveying feedstock into the reactor chamber;

a removal auger removing moving bed reactor particles and char resulting from the thermal treatment process; and a moving reactor bed composed of the moving bed reactor particles and serving as both a moving bed filter and a heat carrier to provide thermal energy for thermal treatment reactions, the moving bed reactor particles flow downward from an outlet of the chute by gravity to the bottom of the reactor chamber where the moving bed reactor particles are discharged from the bottom of the reactor chamber by the removal auger;

wherein a depth of the moving reactor bed is adjusted by changing a distance between the outlet of the chute of the moving bed reactor particles and the feedstock supply auger in order to increase the path for product gas flow through the moving reactor bed and increase surface area of the moving reactor bed, thereby slowing gas flow through the moving reactor bed, and wherein the feedstock supply auger and removal auger are in a facing relationship causing interaction between the moving bed reactor particles and the feedstock particles in a manner facilitating the desired transfer of heat.

6. A moving bed gasification/thermal treatment reactor with geometry in which moving bed reactor particles serve as both a moving bed triter and a heat carrier to provide thermal energy for thermal treatment reactions, such that the moving bed filter and the heat carrier are one and the same to remove solid particulates or droplets generated by thermal treatment processes or injected into the moving bed from other sources, the reactor comprising:

a housing for a reactor chamber, the housing being composed of a reactor wall with a top wall and a base, a chute is provided in the top wall of the housing for the supply of moving bed reactor particles, the housing also includes sloping bottom walls adjacent a bottom of the reactor chamber of the reactor and extending from the reactor wall, the sloping bottom walls which meet adjacent the bottom of the reactor chamber of the reactor wherein the sloping bottom walls guide the moving bed reactor particles and captured char to the bottom of the reactor chamber of the reactor where it is removed by the removal augers, the top wall, reactor wall and sloping bottom walls defining the reactor chamber;

moving bed reactor particles functioning as both a moving reactor bed and a heat carrier;

a feedstock supply auger conveying feedstock into the reactor chamber;

a removal auger removing moving bed reactor particles and char resulting from the thermal treatment process; and a moving reactor bed composed of the moving bed reactor particles and serving as both a moving bed triter and a heat carrier to provide thermal energy for thermal treatment reactions, the moving bed reactor particles flow downward from an outlet of the chute by gravity to the bottom of the reactor chamber where the moving bed reactor particles are discharged from the bottom of the reactor chamber by the removal auger;

wherein the chute for the moving bed reactor particles is vertically adjustable, and wherein the feedstock supply auger and removal auger are in a facing relationship causing interaction between the moving bed reactor particles and the feedstock particles in a manner facilitating the desired transfer of heat.

* * * * *

UNITED STATES PATENT AND TRADEMARK OFFICE
CERTIFICATE OF CORRECTION

PATENT NO. : 9,121,644 B2  
APPLICATION NO. : 13/441045  
DATED : September 1, 2015  
INVENTOR(S) : Badger et al.

Page 1 of 1

It is certified that error appears in the above-identified patent and that said Letters Patent is hereby corrected as shown below:

In the claims

Column 20, line 1, Claim 6, delete "A moving bed" to and ending "transfer of heat", and insert the following claim:

--6. A moving bed gasification/thermal treatment reactor with geometry in which moving bed reactor particles serve as both a moving bed filter and a heat carrier to provide thermal energy for thermal treatment reactions, such that the moving bed filter and the heat carrier are one and the same to remove solid particulates or droplets generated by thermal treatment processes or injected into the moving bed from other sources, the reactor comprising:

a housing for a reactor chamber, the housing being composed of a reactor wall with a top wall and a base, a chute is provided in the top wall of the housing for the supply of moving bed reactor particles, the housing also includes sloping bottom walls adjacent a bottom of the reactor chamber of the reactor and extending from the reactor wall, the sloping bottom walls which meet adjacent the bottom of the reactor chamber of the reactor wherein the sloping bottom walls guide the moving bed reactor particles and captured char to the bottom of the reactor chamber of the reactor where it is removed by the removal augers, the top wall, reactor wall and sloping bottom walls defining the reactor chamber;

moving bed reactor particles functioning as both a moving reactor bed and a heat carrier;

a feedstock supply auger conveying feedstock into the reactor chamber;

a removal auger removing moving bed reactor particles and char resulting from the thermal treatment process; and a moving reactor bed composed of the moving bed reactor particles and serving as both a moving bed filter and a heat carrier to provide thermal energy for thermal treatment reactions, the moving bed reactor particles flow downward from an outlet of the chute by gravity to the bottom of the reactor chamber where the moving bed reactor particles are discharged from the bottom of the reactor chamber by the removal auger; wherein the chute for the moving bed reactor particles is vertically adjustable, and wherein the feedstock supply auger and removal auger are in a facing relationship causing interaction between the moving bed reactor particles and the feedstock particles in a manner facilitating the desired transfer of heat.--

Signed and Sealed this  
Twelfth Day of January, 2016

Michelle K. Lee  
*Director of the United States Patent and Trademark Office*